United States Patent [19]

Tricca et al.

[11] Patent Number: 4,574,101

[45] Date of Patent: Mar. 4, 1986

[54] EXERCISE MAT

[75] Inventors: Raymond A. Tricca, West Barnstable; John K. Foster, Harwichport, both of Mass.

[73] Assignee: Packaging Industries, Inc., Hyannis, Mass.

[21] Appl. No.: 529,129

[22] Filed: Sep. 2, 1983

[51] Int. Cl.⁴ .............................................. B32B 3/26
[52] U.S. Cl. ..................................... 428/138; 428/72; 428/137; 428/218; 428/316.6; 428/318.6; 5/420; 5/481
[58] Field of Search ............. 428/72, 137, 138, 316.6, 428/318.6, 218; 5/481, 420

[56] References Cited

U.S. PATENT DOCUMENTS

| | | | |
|---|---|---|---|
| 3,016,317 | 6/1958 | Brunner | 5/420 |
| 3,818,522 | 6/1974 | Schuster | 428/137 |
| 4,137,583 | 2/1979 | Baldwin | 5/420 |
| 4,147,828 | 4/1979 | Heckel et al. | 5/420 |
| 4,263,727 | 4/1981 | Bender et al. | 428/316.6 |
| 4,357,725 | 11/1982 | Ahlm | 428/316.6 |

Primary Examiner—Joseph L. Schofer
Assistant Examiner—J. M. Reddick
Attorney, Agent, or Firm—Berman, Aisenberg & Platt

[57] ABSTRACT

An exercise mat consisting of laminated outer and core layers of closed-cell plastic foam having different selected densities. A relatively thick central layer is so configured that air chambers are formed bounded by it and one or both of the outer layers. These chambers may be constituted of air cylinders passing vertically through the central layer or of horizontal slots formed on a surface or surfaces of the central layer. The air chambers can be of any suitable predetermined size and spacing. The mat may be configured to permit folding by maintaining one of the outer layers continuous to form a hinge at a point or points where the core layer and other outer layers are discontinuous.

14 Claims, 5 Drawing Figures

EXERCISE MAT

BACKGROUND OF THE INVENTION

This invention relates in general to athletic equipment and in particular to an exercise mat.

Conventional exercise mats are generally composed of a relatively firm padding enclosed in quilted covering material. The padding is usually thick and the quilted outer covering is thin and of durable wear-resistant material such as canvas or vinyl sheet. Such mats provide a reasonable degree of cushioning between typical hardwood flooring and the user which is sufficient for many exercises. However, certain exercises inherently involve more shock to the system than others. For example, in jogging or jumping rope, there is repeated shock to the foot which can cause injury to the foot, leg or even the spine under certain circumstances. Conventional athletic mats are also relatively expensive, cumbersome, and not easily portable. Moreover, they are generally not of integral construction, the interior core and the outer cover comprising separate elements which can and do separate with heavy use.

In recent years, there has been a growing interest in running and jogging as a means of maintaining physical fitness. When weather conditions or time considerations rule out outdoor exercise, there is need for a substitute which will permit indoor exercise. Some form of exercise mat suitable for home use which can easily be stored would be most useful. Most important, the mat should be so designed and constructed that it serves to cushion body shock, especially the type of shock encountered when one is running in place or jumping rope.

A primary object of the present invention is a lightweight, shock-absorbing exercise mat.

A further object of the present invention is a mat which is relatively inexpensive, portable, and easily stored.

SUMMARY OF THE INVENTION

In the present invention, layers of closed-cell foam of different selected densities are laminated together to form an integral mat structure. The foam layer which forms the core of the mat contains a myriad of computer-designed air chambers. In one embodiment of the invention, the chambers are cylindrical in shape and are formed in a vertical array through the core layer. Alternatively, a surface or both surfaces of the core layer may be horizontally slotted to form the air chambers. Also, the mat may be designed to be folded and to include a convenient carrying handle.

For a better understanding of the invention, together with other features, objects and advantages thereof, reference should be made to the following description of a preferred embodiment which should be read in conjuction with the appended drawing in which.

DESCRIPTION OF THE PREFERRED EMBODIMENT

Figure 1:
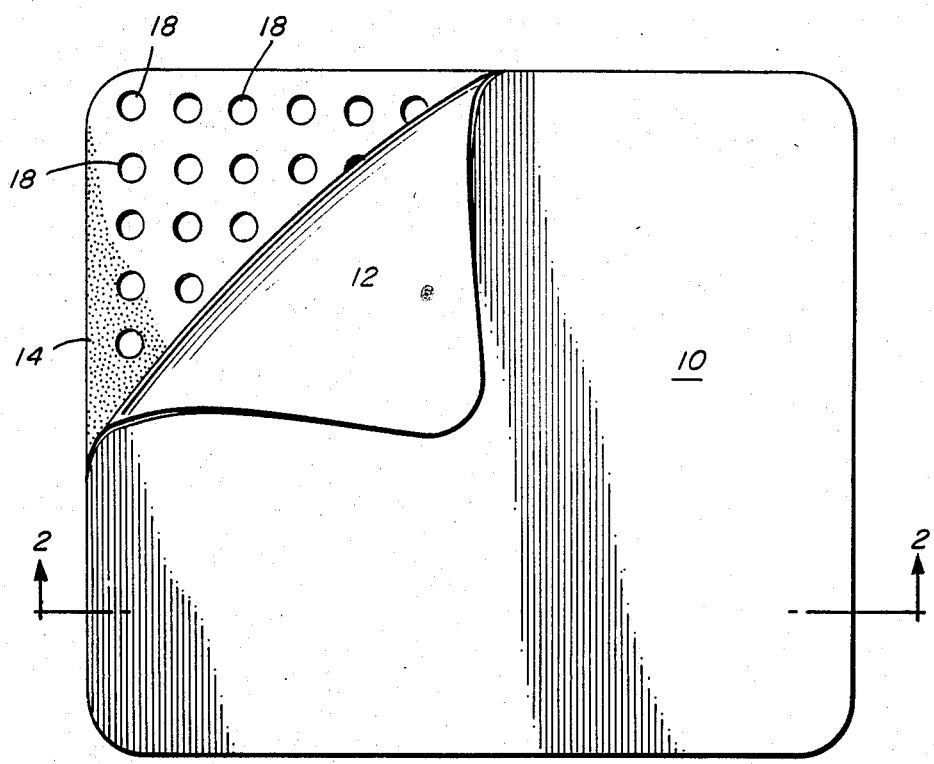
FIG. 1 is a front elevation of a mat having a corner of its laminated cover turned back to illustrate internal structure.
Figure 2:
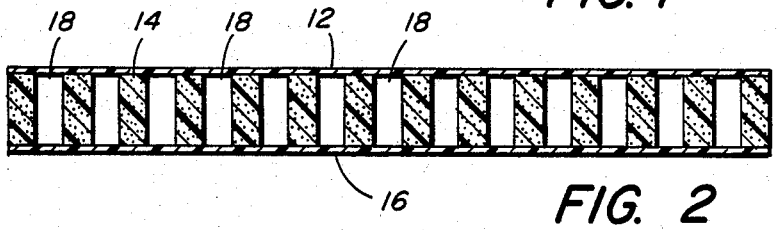
FIG. 2 is a cross-section of FIG. 1 taken along the lines 2—2.

In FIGS. 1 and 2, there is shown an exercise mat 10 composed of an outer layer 12 of closed-cell foam which may be of relatively high density. The outer layer of skin 12 is laminated to the top surface of a thicker core layer 14 of relatively low density closed-cell foam. A third layer or skin 16 is laminated to the underside of the core layer 14 and the third layer is preferably similar in all respects to the outer layer 12.

A plurality of holes 18 are formed vertically through the core layer 14 in a symmetrical pattern. When the outer layers 12 and 16 are laminated to the core layer 14, air is trapped in the holes to form air cylinders which are distributed symmetrically throughout the mat.

The material used for the mat may be any of several closed-cell foams. However, polyethylene has proven to be superior to other materials in almost every particular. It is relatively inexpensive, it is quite durable, and in the mat configuration, it has excellent shock absorbing characteristics.

It is possible to control the shock absorbing qualities of the mat by controlling the number and distribution of air cylinders as well as the thicknesses and densities of the layers.

These factors are interrelated, and the desired degree of cushioning can be established by computer control. One mat which has proven successful for running in place or jumping rope and which cushions 70% of the body shock is made up of a core layer of closed-cell polyethylene foam having a density of 2.5 pounds per cubic foot. The core layer may be one integral layer or may be laminated from a plurality of thinner layers. The outer or skin layers are also made of polyethylene foam and have a density of 5.0 pounds per cubic foot. The holes in the core layer may be 1" in diameter on 2" centers forming a symmetrical over-all pattern throughout the core layer. The size of the mat is not critical, although a mat of approximately 2'×3' has proven suitable. The total thickness of the mat is of the order of 2½", of which the core layer constitutes 2" and each of the skin layers is ¼" thick.

Figure 4:
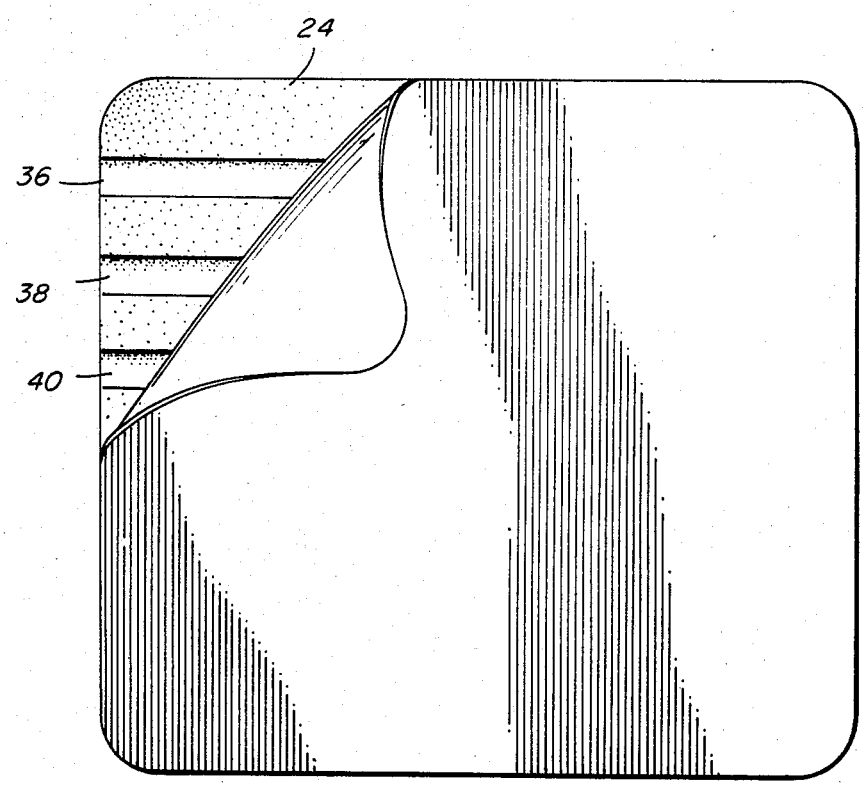
FIG. 4 is a view in perspective of a foldable exercise mat provided with carrying handles.

In FIG. 4, an alternative embodiment of the invention is shown. The core layer 24 may be similar to the core layer 14 of the preferred embodiment. Also, the laminated outer or skin layers 22 and 26 are similar in all respects to the comparable skin layers 12 and 16 of the embodiment of FIG. 1. However, in this instance, the core layer 24 may have formed in its top, bottom, or both top and bottom surfaces a series of horizontal slots 36, 38, 30, etc. When the outer or skin layer is laminated in place over the core layer 24, a series of horizontally disposed air chambers are formed, the outer layer closing off the slots to complete the air chambers. The slots 36, 38, 40, etc. may run the full length or part of the length of the core layer; they may be intermittent to form a series of smaller horizontal air chambers; and they may be formed on one side or on both sides of the core layer. Again, the desired degree of cushioning can be established by suitable computer control.

Figure 3:
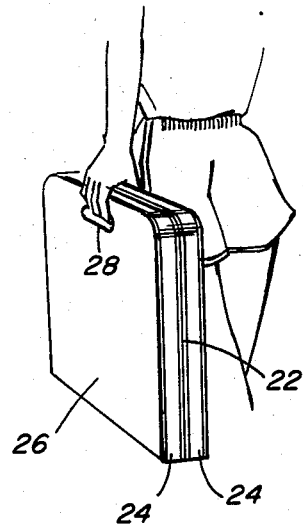
FIG. 3 is a front elevation of an alternative version of the mat of FIG. 1.

In the embodiment of FIG. 3, the mat is preferably somewhat thinner and longer than that of FIG. 1 and has a hinge to permit folding in half. A carrying handle 28 is formed by an opening which passes through the two thicknesses of the folded mat, which, in this embodiment, have a total thickness of about three inches. In use, of course, the mat is unfolded and provides a cushioning surface which is large enough for calisthenic exercises as well as jogging or jumping rope.

Figure 5:
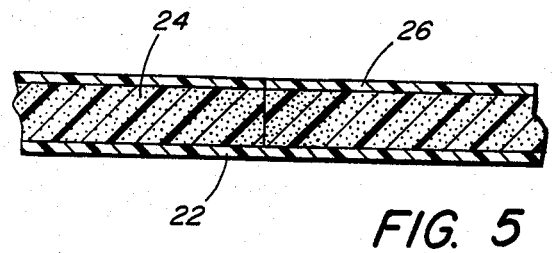
FIG. 5 is a detailed showing of an integral hinge formed in the mat.

FIG. 5 illustrates one manner in which the hinge may be formed. One of the outer or skin layers may be continuous, while the other skin layer and the core layer are cut in two. When the mat is folded, it appears as in FIG. 3, the layer 22 being the continuous hinge layer. When the mat is unfolded it appears as in FIG. 5, the cut edges of the layers 24 and 26 being in abutting relationship. Of course, the mat may include more than one hinge for folding it into as many sections as are convenient.

When the mat is used for in-place jogging or jumping rope, the computer-designed air chambers and the nature of the closed-cell foam provide extraordinary flexibility against the stress that the foot and lower leg would otherwise experience. The air chambers not only absorb much of the shock of the foot strike, but they also tend to spring back, supplying an accelerated upward push as the foot leaves the mat.

What is claimed is:

1. An exercise mat comprising a central, relatively thick core layer of closed-cell foam, said core layer having a plurality of air chambers therein, and two relatively thin outer skin layers of closed-cell foam, the density of said core layer being less than the density of each of said outer skin layers, each of said thin outer skin layers being laminated in sealed relationship to a respective outer surface of said thick core layer.

2. An exercise mat as defined in claim 1 wherein said air chambers are vertically disposed, cylindrical in shape, and contain trapped air.

3. An exercise mat as defined in claim 2 wherein said core layer is approximately four times as thick as the combined thicknesses of said two outer layers.

4. An exercise mat as defined in claim 1 having matching openings formed adjacent the ends thereof to serve as carrying handles, said mat being foldable to align said two openings whereby said mat may be hand-carried.

5. An exercise mat as defined in claim 1 wherein said air chambers comprise horizontally arranged slots formed in at least one surface of said core layer.

6. An exercise mat as defined in claim 1 wherein said air chambers comprise horizontal slots formed in both surfaces of said core layer.

7. An exercise mat as defined in claim 4 wherein said core layer and one of said outer layers are interrupted, the other of said outer layers being continuous and flexible to permit folding of said mat.

8. An exercise mat as defined in claim 1 wherein the density of each of said outer layers is approximately twice the density of said core layer.

9. An exercise mat as defined in claim 8 wherein the density of each of said outer layers is 5.0 pounds per cubic foot and the density of said core layer is 2.5 pounds per cubic foot.

10. An exercise mat as defined in claim 1 wherein said closed-cell foam is polyethylene foam.

11. An exercise mat as defined in claim 1 wherein said core layer comprises an integral layer of foam.

12. An exercise mat as defined in claim 1 wherein said core layer comprises a plurality of layers.

13. An exercise mat as defined in claim 1 wherein said air chambers are arranged in a symmetrical pattern.

14. An exercise mat as defined in claim 2 wherein said air chambers are arranged in a symmetrical pattern.

* * * * *